United States Patent
Nielsen et al.

(10) Patent No.: US 6,190,034 B1
(45) Date of Patent: *Feb. 20, 2001

(54) MICRO-MIXER AND MIXING METHOD

(75) Inventors: Claus Rye Nielsen, København Ø; Jens Anders Branebjerg, Hørsholm; Peter Gravesen, Nordborg; Poul Dyhr-Mikkelsen, Sydals; Niels Gade, Sønerborg, all of (DK)

(73) Assignee: Danfoss A/S, Nordborg (DK)

(*) Notice: Under 35 U.S.C. 154(b), the term of this patent shall be extended for 0 days.

This patent is subject to a terminal disclaimer.

(21) Appl. No.: 09/051,236

(22) PCT Filed: Oct. 1, 1996

(86) PCT No.: PCT/DK96/00416

§ 371 Date: Nov. 10, 1998

§ 102(e) Date: Nov. 10, 1998

(87) PCT Pub. No.: WO97/12665

PCT Pub. Date: Apr. 10, 1997

(30) Foreign Application Priority Data

Oct. 3, 1995 (DE) .............................. 195 36 856

(51) Int. Cl.[7] ........................................ B01F 5/06

(52) U.S. Cl. ............... 366/336; 366/340; 366/341; 138/42; 137/896; 137/599.12

(58) Field of Search .................... 366/336, 337, 366/340, 167.1, 173.1, 341; 136/42, 44; 137/1, 3, 9, 10, 599.01, 599.03, 599.12, 602, 896

(56) References Cited

U.S. PATENT DOCUMENTS

| | | | |
|---|---|---|---|
| 3,182,965 | * 5/1965 | Sluijers | 366/340 |
| 3,195,865 | * 7/1965 | Harder | 366/337 |
| 3,206,170 | * 9/1965 | Schippers et al. | 366/337 |
| 3,239,197 | * 3/1966 | Tollar | 366/337 |
| 3,406,947 | * 10/1968 | Harder | 366/337 |
| 3,506,244 | * 4/1970 | Strang | 366/337 |
| 3,776,696 | * 12/1973 | Kato et al. | 436/164 |
| 3,963,221 | * 6/1976 | Yi | 366/337 |
| 4,793,247 | * 12/1988 | Verweij | 366/338 |
| 5,094,793 | * 3/1992 | Schrenk et al. | 366/340 |
| 5,105,843 | * 4/1992 | Condron et al. | 137/13 |
| 5,222,808 | * 6/1993 | Sugarman et al. | 366/274 |
| 5,407,269 | * 4/1995 | Sherry et al. | 366/174.1 |
| 5,429,728 | * 7/1995 | Gordon | 204/453 |
| 5,736,740 | * 4/1998 | Franzen | 250/288 |

* cited by examiner

Primary Examiner—Tony G. Soohoo
(74) Attorney, Agent, or Firm— Lee,Mann,Smith, McWilliams, Sweeney & Ohlson

(57) ABSTRACT

A micro-mixer is disclosed having at least one mixing point which is connected to an inlet channel arrangement having at least two inlet channels and to an outlet channel arrangement, and a mixing method is disclosed for at least two fluids which are supplied from different directions. With this mixer and method it is intended to achieve a rapid and predeterminable mixing of the fluids. For that purpose, a separating element which extends into a region of the mixing point in which the inlet channels run parallel to one another is provided. By this means the fluids can be kept separate from one another until their flow speeds virtually coincide in respect of value and direction. Only then are they brought into contact with one another.

18 Claims, 3 Drawing Sheets

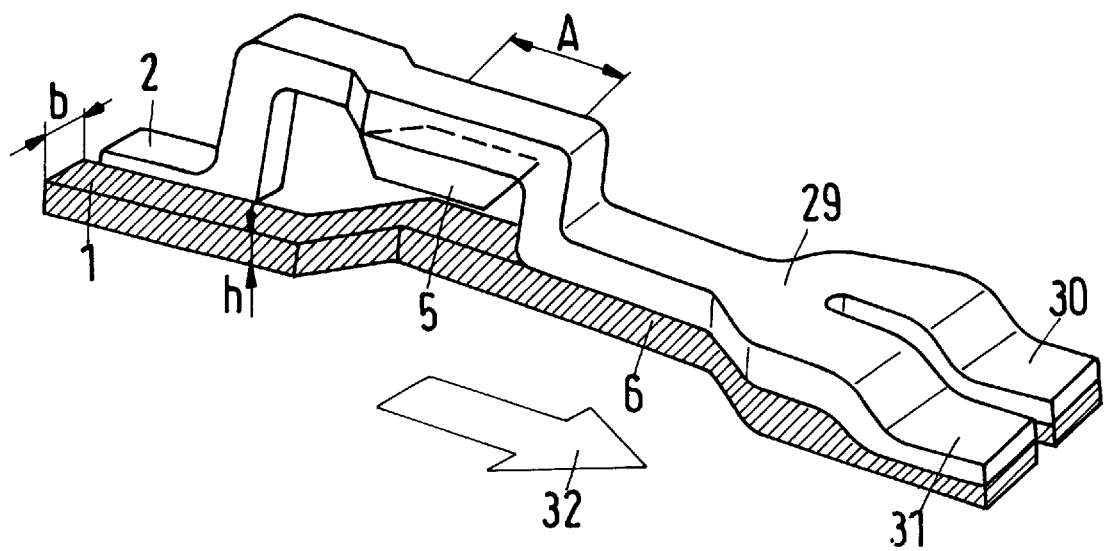
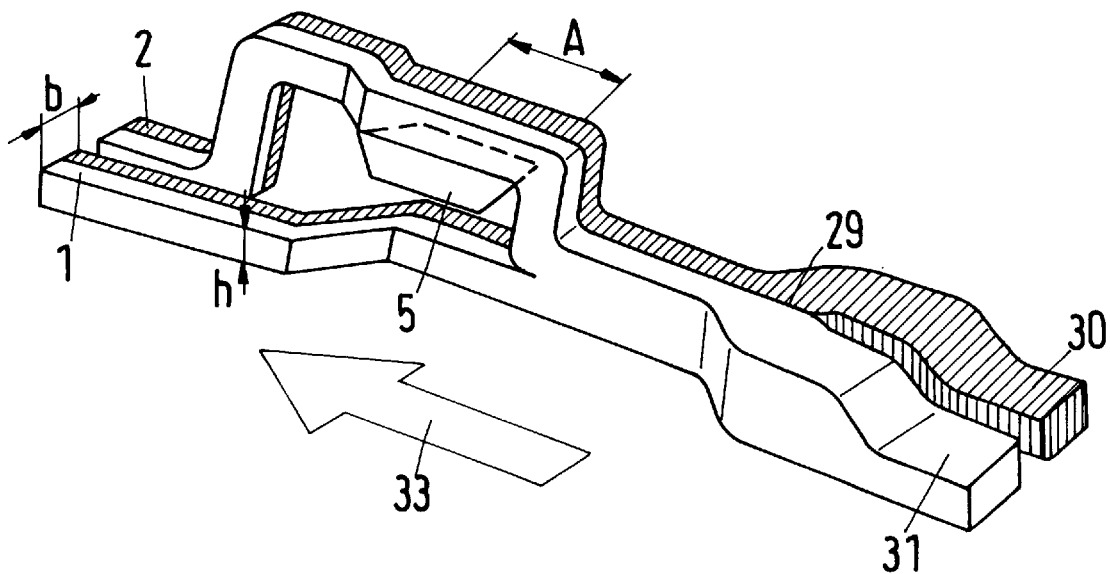

MICRO-MIXER AND MIXING METHOD

BACKGROUND OF THE INVENTION

The invention relates to a micro-mixer having at least one mixing point which is connected to an inlet channel arrangement having at least two inlet channels and to an outlet channel arrangement. The invention relates furthermore to a mixing method for at least two fluids which are supplied from different directions.

Mixing of fluids is frequently required in order to initiate a chemical reaction. Such chemical reactions are necessary, for example, in an analysis in which the presence and/or concentration of a species in a fluid is to be determined. For that purpose the fluid has added to it a reagent (or several reagents), which form with the species a reaction product which can be detected in a detector. A controlled and homogeneous mixing of the fluid and the reagent, that is, between two or more fluids, is desirable here. The volume required for the mixing should be kept as small as possible, however, in order that the consumption of reagents does not become too great.

A static micro-mixer of the kind mentioned in the introduction has been proposed by the Technischer Universität Ilmenau, Faculty of Engineering, micro-systems engineering department in D-98684 Ilmenau. The base body of this micro-mixer consists of silicon. Micro-channels and openings are made in this base body. These channels are hermetically sealed by silicon or glass substrates. Mixing of two liquids is effected in that these two liquids are layered horizontally side by side in a mixing element and then separated vertically. The mixing element is in this case formed by a recess into which the two inlet channels open from opposite sides. Two part-flows are then extracted from this recess and are later mixed in the same manner in a following mixing element.

With this construction it is relatively difficult to predict the mixing behaviour of the liquids with sufficient accuracy. Predictions about the course of the reaction between the two fluids are therefore possible only to a limited extent. In a subsequent analysis of a reaction product there is therefore always the uncertainty as to whether the reaction, after complete mixing of the two fluids, has already finished or, if that is not the case, whether the individual reaction times are reproducible. This disadvantage can, of course, be mitigated by waiting for a certain time after bringing the two fluids together, but this waiting time slows down the analysis.

SUMMARY OF THE INVENTION

The invention is based on the problem of allowing a rapid and predeterminable mixing of fluids.

In a micro-mixer of the kind mentioned in the introduction, this problem is solved in that the inlet channels in the mixing point run parallel to one another in the same direction and that a separating element is provided which extends into a region of the mixing point in which the inlet channels run parallel to one another.

Using such a micro-mixer, the two fluid flows are, as it were, laminated onto one another. They meet in the mixing point having the same direction and the same speed. As soon as the separating element ends, each fluid flow lies smoothly on the other and a boundary surface is created, through which mixing by diffusion can take place. The diffusion behaviour of the two fluids is known or is determinable. By virtue of the construction of the micro-mixer, however, the diffusion area, which is an essential factor in the progression of the diffusion, is also known. The diffusion area corresponds to the area of the outlet channel in which also the separating element lies. A mixing of the two fluids which is effected by a mutual equalization of concentration can be observed.

It is also preferred for the inlet channels to be guided parallel to one another in offset planes at least in a section upstream of the mixing point. The inlet channels are here guided one above the other. In this manner arrangement of the two fluids in layers can be further influenced, for example, so that the individual layers are as wide and as thin as possible.

The inlet channels preferably have a width that is greater than their height. The width can be arranged substantially parallel to the planes. In this manner a really large diffusion area is produced when the two fluids are brought together. The larger is the diffusion area, the more quickly can mixing proceed. The diffusion surface is flat. The layer thickness or the height of the two fluids is constant over the width, so that the mixing behaviour can be predetermined relatively easily. With otherwise unchanged conditions, as the width increases the height decreases, so that the diffusion length shortens.

It is also preferred for the inlet channels to widen upstream of the mixing point. In this manner an even larger diffusion area and a smaller layer thickness can be created. Since at any rate a change in direction at least for a part of the fluid flow is associated with widening, after widening and before bringing the fluids together the same direction and optionally speed must first be restored.

In that case it is especially preferred for widening to effect a doubling of the width. At the same time the height of the inlet channels is halved, so that the cross-sectional area remains constant. There is no accompanying change in the speed of the flow.

The outlet channel arrangement is advantageously directed in the same direction as the inlet channels. The fluids therefore flow through the micro-mixer substantially in one main direction. Undue deviations can be avoided, because in that case there will always be the risk that it will not be possible to predict the diffusion area with sufficient accuracy. Relatively small changes in direction can be allowed, however.

In an especially preferred construction, provision is made for at least one outlet channel of the outlet channel arrangement to be divided into at least two sub-channels which form an inlet channel arrangement of a following mixing point. In this manner at each subsequent mixing point the number of layers doubles (in the case of two inlet channels of the mixing point) or even trebles (in the case of three inlet channels of a mixing point). The number of diffusion areas increases accordingly. The individual fluids are applied to one another in increasingly thinner layers. Apart from the enlargement of the diffusion areas, this has the added advantage that mutual penetration of the fluids can be effected considerably more quickly because the thickness that has to be penetrated by respective fluids is much smaller.

The sub-channels preferably lie in the same plane, which is defined by the width dimension. The division is therefore effected parallel to the narrow sides or to the height of the channels, whilst the application of the fluids to each other takes place parallel to the wide sides of the channel or at right angles to the lamination face of the preceding mixing point. This ensures that the greatest possible diffusion area is utilized.

The outlet channel arrangement preferably comprises a single outlet channel. Formation of the diffusion area between the individual fluids can be ensured in the best possible manner in this instance.

The separating element is preferably in the form of a flat plate. As each fluid lies on the other, no noticeable steps occur which could lead to disturbance during lamination of the two fluids onto one another.

It is in that case preferred for the separating element to have openings which are substantially smaller than the area of the separating element exposed to the inlet channels. Despite the openings, flow of the fluid is enforced and maintained until the fluids have the same direction and optionally the same flow speed. Manufacture of the micromixer is substantially simplified with the openings. For example, it is possible to reach right through the separating element to form an inlet channel by removing material.

One liquid path preferably has a course in one plane from at least one inlet channel to the outlet channel arrangement. This simplifies manufacture. Such a channel can be easily made in a surface of a component.

A mixer according to the invention preferably consists of a bottom part and a top part, which lie next to each other at a join-defining surface, the inlet and outlet channels being in the form of grooves in the bottom part and/or top part which are open towards the join-defining surface, and the separating element at least partially covering an overlap region of grooves in the bottom part and top part. Such a mixer can be manufactured very easily in planar technology. Small channel cross-sections can be achieved here with great precision. Because the separating element at least partially covers an overlap region of the grooves in the bottom part and top part, it is possible to guide these grooves parallel for a certain distance but at the same time to keep the channels separate. As has been described above, this opportunity can be exploited, on the one hand, to arrange the separating element in the region of the inlet channels just upstream of the mixing point or in the mixing point, so that each fluid can be aligned parallel with the other before lying on the other. If the mixer is operated in the reverse direction, separation of the fluid flow with the separating element can be achieved, this separation being effected by the separating element. The separating element acts as a blade or cleaver. Because the separating element is arranged in the region of the join-defining surface, above and below the separating element the respective channels are available so that the fluid can still continue to flow straight ahead at least for a short distance. There is therefore no turbulence of the fluid accompanied by a change in the flow characteristics. Such a division of the fluid flow can be used, for example, to make two flows from one fluid flow, these flows then being channelled one above the other again in order to be laminated one onto the other. "Channelling them one above the other" relates to an alignment in relation to a plane in which also the separating element lies. The two part-flows are therefore channelled above and below the plane.

Advantageously, parts of the inlet channel arrangement, parts of the mixing point, and the outlet channel arrangement are formed in the bottom part as grooves open towards the join-defining surface, and the remaining parts of the inlet channel arrangement and the remaining parts of the mixing point are arranged as a recess in the top part, which recess is partly covered by the separating element. Such a configuration allows simple manufacture and a compact construction. The construction of the grooves in the bottom part can be carried out without difficulty by means of known techniques. Milling, etching or other material-removing techniques known from the field of semiconductors and microelements may be considered as examples. The recess in the top part can also be made without difficulty. Since there is only a single join-defining surface, sealing is also relatively simple.

The separating element is advantageously part of the top part. Altogether there are therefore only two parts which have to be manufactured. Even when the separating element is in one piece with the top part, manufacture is relatively simple because the separating element can have openings through which the recess can be made.

The separating element advantageously has a recess of concave or triangular construction directed towards the inlet channel arrangement. Such a recess enables the two fluids to meet in the middle of the channels earlier than at the edges. In this case the fact that in a laminar flow the flow speed is greater in the middle than at the edges has been taken into account.

In a further preferred embodiment, provision is made for the inlet channel arrangement to have three inlet channels. This provides for the lamination of three fluid layers together.

In a special construction, provision can in this case be made for the middle inlet channel, at least in the mixing point, to be narrower than the two other inlet channels. It is then possible for the fluid from the middle inlet channel to be encapsulated by the two fluids from the outer inlet channels. This is readily understandable for the covering layers top and bottom, that is to say, the two layers which lie in the respective planes fed by the two outer inlet channels. But since in the middle between these two planes only a relatively small width of the inlet fluid from the middle inlet channel is covered at the two outer edges, the two fluids from the outer inlet channels, looking in the width direction, will draw near to one another and come into contact. This produces an encapsulation of the middle fluid by the two outer fluids. This encapsulation can also be used for mixing. But a quite different effect can be achieved when the cross-sections of the channels are selected to be of a suitable size: in that case, in fact, a jacket can be placed around the middle fluid which prevents that fluid from coming into contact with the walls of the adjacent channels, at least for a certain period of time.

In another or additional construction, downstream of the mixing point there is arranged an additional inlet channel arrangement and mixing point, the lamination action of which is rotated through 90° with respect to the first mixing point. In that case, lamination occurs not only from top and bottom but also from left and right, which ultimately has the same effect. The middle fluid is then encapsulated and can no longer come into contact with the walls of the channel.

In a method of the kind mentioned in the introduction, the problem is solved in that the fluids are aligned parallel to one another and they are kept separate from one another until their flows virtually coincide in respect of direction and only then are they brought into contact with one another.

As stated above in connection with the micro-mixer, in this manner a lamination of the two fluids onto one another is achieved, which ultimately allows mixing which is based virtually exclusively on diffusion. The diffusion area and the diffusion length, that is, the height of the individual layers, can here be predetermined relatively easily, so that the diffusion process per se, and thus the mixing sequences, can be also predetermined relatively accurately.

The flow speeds of the fluids are preferably brought into approximation with each other and the fluids are kept separate from one another until these flow speeds are also equal to the extent necessary and only then are the fluids brought into contact with one another. In this manner, turbulence of the fluids as they come into contact is very reliably avoided. The operation proceeds smoothly. Matching of the flow speed is preferred, but not necessary.

In a preferred construction, the fluids are brought into contact with one another with their respective largest boundary surface. In this manner a large diffusion area and a small diffusion length are achieved, so that rapid mixing of the fluids is effected, based virtually exclusively on diffusion. The boundary surface or border surface is in this case the surface which defines the respective fluid parallel to the direction of flow.

The flow cross-section of the fluids is preferably widened before they lie on one another. In this manner the diffusion area is further enlarged and the diffusion length further shortened, which accelerates the mixing process.

It is also preferred for the combined fluid flow to be divided, the division being made parallel to a narrow side of the flow cross-section and the part-flows being channelled one above the other and, once direction and flow speed have been brought into approximation, brought into contact. Repeated division and layering produces on the one hand very thin layers, and on the other hand a large number of diffusion areas, so that the mixing process can be concluded in a short time.

Advantageously, three fluids are combined with one another, the middle fluid having a flow cross-section of reduced width compared with the two other fluids. In this way, as stated above, the middle fluid is encapsulated by the two other fluids.

It is also preferred for two further fluids to be supplied additionally from the side, the direction and speed of which approximate to the direction and speed of the already combined fluid flow, for the fluids to be kept separate from the combined fluid flow until all speeds and directions coincide and only then are the two fluids brought into contact with the combined fluid flow. It is only at the interfaces between the individual fluids that co-ordination of the speeds is required, of course. Once they are in contact with one another, a combined fluid flow will then develop and assume a laminar flow profile again. The fluid in the middle fluid flow can be encapsulated also using this measure.

It is especially preferred for the supply of at least one outer pair of fluids to be effected simultaneously. This reduces the overall length that is required for encapsulation of the fluid.

BRIEF DESCRIPTION OF THE DRAWINGS

The invention is described hereinafter with reference to preferred embodiments in conjunction with the drawings, in which:

FIG. 7 is a view corresponding to FIG. 1 having a division of the two adjacent fluids after the mixing point, and FIG. 8 is a view corresponding to FIG. 7, in which the flow direction is reversed.

DESCRIPTION OF THE PREFERRED EMBODIMENTS

For the following explanation, liquids are used as fluids. Gases can be mixed equally well in the same manner, however.

Figure 1:
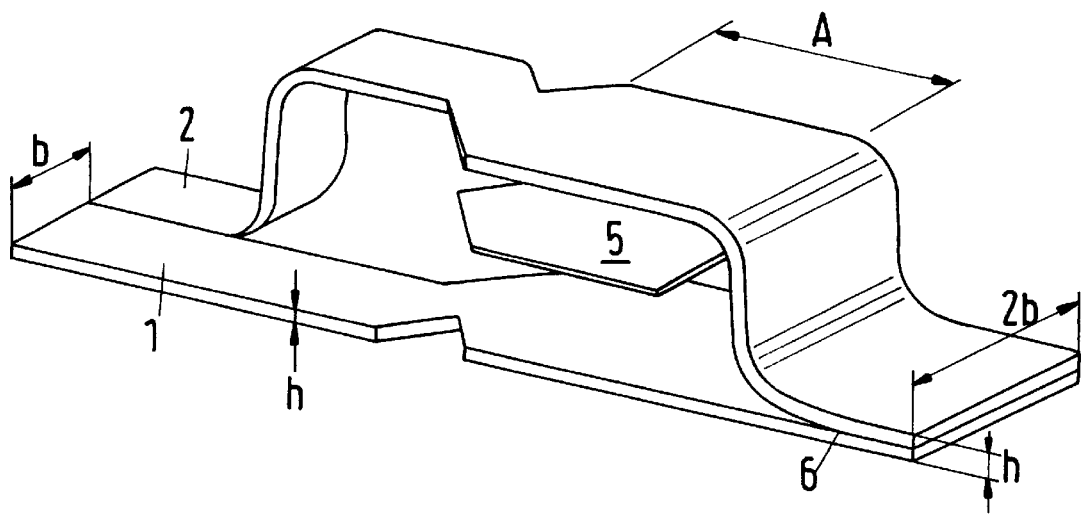
FIG. 1 is a diagrammatic representation of the mixing of two fluids.

FIG. 1 shows diagrammatically how two liquids 1, 2 are mixed with one another. For reasons of clarity, the illustration in FIG. 1 is shown exploded and greatly exaggerated in height. In reality, the steps illustrated are much lower. The extent by which they exceed the height of a liquid layer or liquid flow is insignificant.

The two liquid flows 1, 2 flow in separate channels, so-called inlet channels 3, 4 (see FIG. 2), which together form an inlet channel arrangement. As clear from FIG. 1, the liquid flows have a width b that is considerably larger than the height h. At the start of the inlet channels 3, 4, both flows 1, 2 are flowing in the same plane.

Whereas the liquid flow 1 remains in this plane and changes only inasmuch as it widens in a specific section to double the width and decreases to half the height, the second liquid flow 2 is channelled into a plane that is offset with respect to the plane of the first liquid flow 1. In that plane the second liquid flow 2 likewise widens to double the width and decreases to half the height. In that region the two liquid flows 1, 2 are channelled one above the other. Since both liquid flows 1, 2 were originally arranged side by side, channelling the two liquid flows 1, 2 one above the other requires that they are supplied from different directions to a common region A in which they are arranged one above the other. In that region A the two liquid flows 1, 2 are now so guided that at the end they have the same direction of flow and also the same flow speed. Until that state is reached, they are kept separate by a separating element 5. The separating element 5 merely has to ensure that the two currents of the two liquid flows 1, 2 do not influence each other. It is therefore possible at the end of the region A to let both liquid flows 1, 2 flow with a laminar flow at the same speed in the same direction. When therefore the separating element 5 ends, the two liquid flows come into contact with one another at a contact face 6. The combined liquid flows then have a width 2b and a height h. The risk that turbulence will occur in the contact face 6 between the individual liquid flows 1, 2 is extremely slight. Mixing between the two liquids from the liquid flows 1, 2 is effected virtually exclusively by diffusion, that is, by a gradual equalization of concentrations through the contact face 6. The mechanism of diffusion is known per se. Critical influencing factors here are, inter alia, the size of the contact face 6 through which the diffusion is effected and which is therefore referred to hereinafter also as "diffusion area", and the thickness of the individual layers. Both factors can be very accurately set in the mixer described here. The width of the diffusion area corresponds to the width 2b of an outlet channel 7 (FIG. 2), the height corresponds to half the height of the outlet channel 7.

Because the two liquid flows 1, 2 are virtually laminated on to one another, a very easily controllable mixing of the two liquids by diffusion is provided.

As mentioned above, the step which liquid flow 2 has, is shown on an exaggeratedly large scale. In reality the step from the lower plane to the upper plane is only about the height h of the first liquid flow plus the thickness of the separating element 5. At the second step, which returns the liquid flow 2 from the second plane to the first liquid flow 1 again, the height corresponds only to the thickness of the separating element 5.

Figure 2:
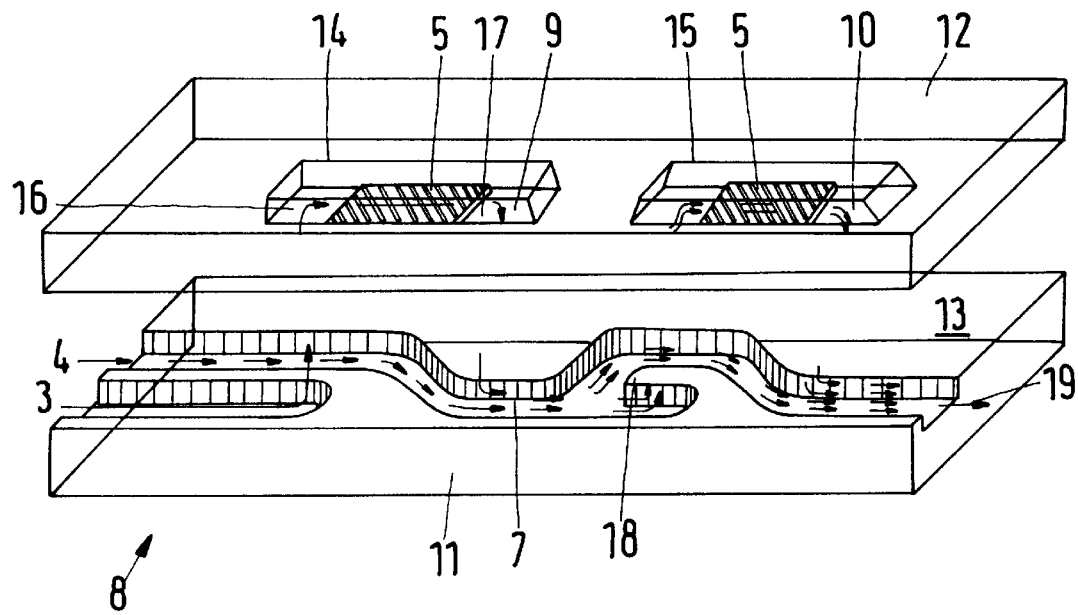
FIG. 2 is a diagrammatic perspective exploded view of a micro-mixer.

FIG. 2 shows a mixer which can be used to implement the sequence illustrated in principle in FIG. 1. In the mixer 8 illustrated in FIG. 2 the channels do not, however, widen before the mixing point. For that reason, the mixer 8 has two mixing points 9, 10 arranged one behind the other which are of substantially the same construction.

The mixer 8 consists of a bottom part 11 and a top part 12 which are illustrated lifted away from one another in FIG. 2, but which in reality lie adjacent one another by way of a join-defining surface 13. For example, they can be adhesively secured to one another here.

The bottom part 11 consists, for example, of glass. One inlet channel 4, the outlet channel 7 and a part of the mixing points 9, 10 are made in the join-defining surface 13 of the bottom part, for example by milling or etching or other micro-techniques. It is easy to see that a continuous channel which runs substantially in one plane is created in the bottom part 11 by this means. For reasons of clarity, the height of this channel is shown greatly exaggerated. In reality it is much shallower. The width of the channel is about 200 µm, the height about 30 µm.

The top part 12, which can consist of silicon, for example, has a respective recess 14, 15 for each mixing point 9, 10, which recesses are partly covered by the separating element 5. The separating element 5 and the top part 12 are constructed in one piece. The recesses 14, 15 also can be etched into the top part 12. It is also possible, of course, to construct the separating element 5 as a separate component and to arrange it between the top part 12 and the bottom part 11 as these are being assembled. The separating element 5 can be in the form of a thin plate, or alternatively a foil.

In the direction of flow upstream of the separating element 5 there is therefore an opening 16 through which the liquid from the inlet channel 3 is able to rise up into the recess 14. This rise is enforced because the inlet channel 3 ends in this region. The liquid has no other option but to pass through the opening and enter the recess.

The recess 14 furthermore has an opening 17 beyond the separating element 5 in the direction of flow, which opening forms the actual mixing point 9. Here, the liquid applies itself to the liquid flow that has flowed there from the second inlet channel 4. At the end of the opening 17 the liquid has to flow down again into the outlet channel.

As one can see, the inlet channel 4 has undergone two changes of direction up to this position. It has flowed around the end of the first inlet channel 3 and then continues virtually as an extension of the first inlet channel 3. The separating element 5 is long enough for it to cover this directional change of the second inlet channel 4 completely, and does not unblock the opening 17 until the flow from the second inlet channel 4 has adjusted again so that it is flowing parallel to the front edge of the lower part 11. The flow in the recess 14 also has same flow direction. Both liquids are then flowing at the same speed and in the same direction. They can then be applied smoothly to one another. After that operation, diffusion begins. Because of the guidance provided by the inlet channel 4, the path which the liquid has to cover here is approximately the same length as the path of the liquid from the inlet channel 3.

The second mixing point 10 is supplied from the outlet channel 7 of the first mixing point 9. For that purpose the liquid flow from the outlet channel 7 is divided into two part-flows by a projection 18 in the bottom part 11 directed towards the outlet channel 7. Because its channel ends there, one part-flow is forced into the recess 15 of the second mixing point 10. The other part-flow flows around the outside and combines with the first part-flow at the mixing point 9. Once the two liquids from the inlet channels 3, 4 have been laminated vertically one onto the other at the first mixing point 9, at the second mixing point 10 there is a doubling of the number of layers. When the height of the outlet 19 is kept constant, this causes not only an increase in the number of diffusion areas, but at the same time also a reduction in the height of the individual layers. When further mixers of this kind are connected in series, at each mixer the number of layers is doubled and the height of the layers is halved. With n mixers, two $2^n$ layers are produced. This is indicated diagrammatically in FIG. 2 by means of arrows. All layers then lie with their widest surfaces against one another so that a good mixing by diffusion can be ensured.

FIG. 2 illustrates diagrammatically that the separating element 5 is in the form of a flat plate which has openings. These openings 20 are shown more clearly in FIG. 3. Here, each of the two inlet channels 3, 4 is guided into region A with a change in direction. In order to make the different planes clear, one inlet channel 3 is illustrated with solid lines, whilst the other inlet channel 4 is illustrated with broken lines.

The openings 20 are shown exaggeratedly large for reasons of clarity. In reality, the openings 20 are much smaller. Their total area is substantially smaller than the remaining area of the separating element. These openings serve for etching out of the recesses 14 in the top part 12. They are still small enough, however, for no premature mixing of the individual liquid flows in the inlet channels 3, 4 to take place before the flows have become matched again in respect of speed and direction. The openings as shown run at an acute angle to the outlet channel 7. They can also be arranged at right angles thereto, however, or even run in the direction of the outlet channel; the latter alternative has the advantage that a good pressure compensation between top side and bottom side of the separating element 5 is achieved.

Figure 3:
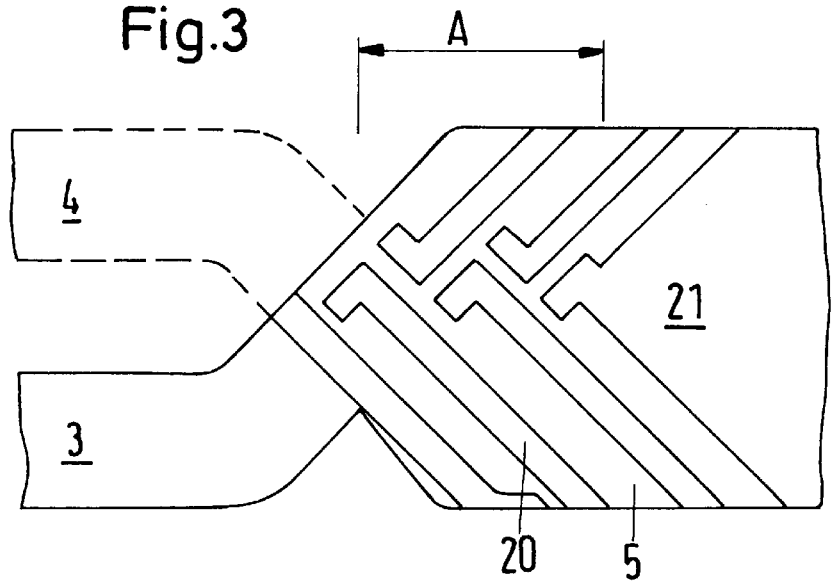
FIG. 3 is a plan view of a separating element.

As is also clear from FIG. 3, the separating element 5 has a triangular recess 21 at its end in the direction of flow. There, the two liquids are able to come into contact with one another even earlier. This takes account of the fact that the flow speed of laminar flows is greater in the middle than at the edge.

Figure 4:
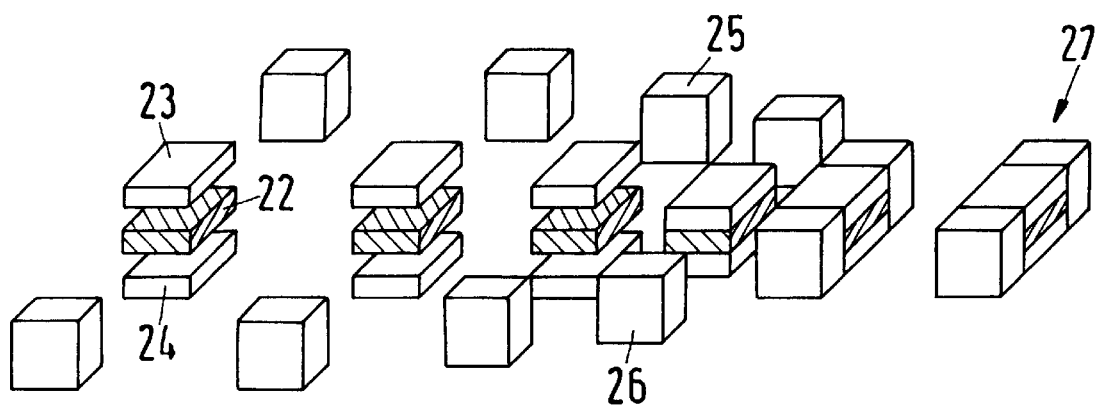
FIG. 4 is an illustration of a composite fluid structure.

The main area of use of the mixer 8 is to mix two liquids. Surprisingly, however, it has been found that with a slight modification of such a mixer another application purpose can be achieved. To be precise, one liquid can be encapsulated inside other liquids. This will be explained in greater detail with reference to FIG. 4. The liquid 22 to be encapsulated is shown hatched. The encapsulating liquids are shown blank.

For encapsulation, three liquid flows are provided, of which the middle one is the liquid 22, whilst the two outer ones 23, 24 are formed by the encapsulating liquid. These three liquid flows 22, 23, 24 are laminated onto one another by a mixer, as illustrated on the left-hand side of FIG. 2. It is quite possible for lamination to be effected in mixing points arranged one after the other. When the liquid 23 is denoted as the upper liquid and the liquid 24 is denoted as the lower liquid, in a following step two further flows of liquid 25, 26 are laminated from left and right onto the combined liquid 22-24, so that finally the end flow of liquid 27 is created, shown on the right in FIG. 4. In such an encapsulation process, the layers of the encapsulating liquids will, of course, be selected to be somewhat thicker, because diffusion will occur between the individual liquids in an encapsulation of this kind also. Since the individual surfaces through which diffusion can be effected and the layer thicknesses can be predetermined relatively accurately, however, the time for which the liquid 22 will be encapsulated by the other liquids 23-26 can also be estimated relatively accurately.

Figure 5:
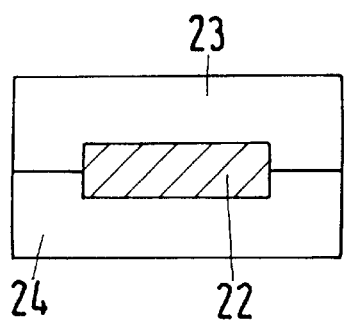
FIG. 5 shows another composite fluid in cross-section.

FIG. 5 shows another embodiment for encapsulation, in which the liquid 22 is encapsulated only by two liquids 23, 24. For that purpose, in principle the only requirement is that the width of the liquid flow 22 is less than that of the two other liquid flows 23, 24. In that case the surrounding liquids 23, 24 will advance at least also beyond a part of the height of the liquid 22, then lie on one another subsequently. It should be pointed out, however, that here, in the region of the narrow sides, the separating face between the individual liquids 22, 23 and 22, 24 is not so accurately predeterminable. Such an encapsulation can be achieved with the necessary reliability only if the height of the liquid 22 is very small in relation to its width.

Figure 6:
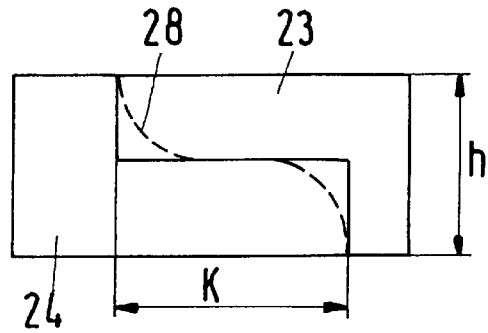
FIG. 6 shows a third composite fluid in cross-section.

FIG. 6 shows that for laminating the liquids onto one another is it not necessary for the two liquids 23, 24 to be aligned exactly one above the other. It is sufficient if there is an overlap k, which is very large compared with the height h. Otherwise diffusion areas 28 form, as illustrated in FIG. 6, the course of which cannot be readily predetermined with the desired and necessary accuracy.

Corresponding to the illustration of FIG. 1, FIG. 7 shows diagrammatically how two liquids are mixed with one another. The same reference numbers are therefore used. Here too, the illustration is shown exploded and on a greatly exaggerated scale for reasons of clarity. In reality, the steps illustrated are much lower. They exceed the height of a liquid layer or of the separating element 5 only insignificantly.

Once the two liquid flows 1, 2 have come into contact with one another at the contact face 6, the two liquid flows are separated from one another at right angles to the plane of the separating element 5. For example, the projection 18 illustrated in FIG. 2 can be used for that purpose. The separation point is denoted by 29 in FIG. 7. Two liquid flows 30, 31 are thereby created which comprise the original liquid flows 1, 2 and each has virtually the same cross-section as the respective liquid flows 1, 2. They consist, however, of two layers, so that each of the two flows 30, 31 consists of the liquid 1 and the liquid 2. The two liquid flows 30, 31 can now be passed to the inlet of a next mixing stage and there be used as liquid flows 1, 2. After several mixing stages, the liquid layers are then very shallow but "stacked" in a large number one above the other.

The throughput of liquid is effected in the direction of the arrow 32, that is, in FIG. 7 essentially from left to right.

FIG. 8 shows the mode of operation when such a mixer is operated in the reverse direction. Here, in the region 29 each of the two liquids 30, 31 lies on the other, but not along a horizontal plane, as in FIG. 7, but along a vertical plane.

Using the separating element 5, this combined fluid flow is now divided, to be precise this time not along a vertical plane as in FIG. 7 but along a horizontal plane. When the two liquid flows are channelled as liquid flows 1, 2 side by side parallel to one another again at the left-hand end of FIG. 8, they can be mixed with one another again in a subsequent mixing stage, that is, can be laminated onto one another along a vertically running plane.

As is clear from FIG. 8, it is not absolutely necessary for a separating element to be present during lamination onto one another if the directional changes of the two fluids 30, 31 prior to coincidence are not allowed to become too great. Nevertheless, a separating element can improve or facilitate the mixing operation.

In the manner illustrated it is possible to achieve an arrangement of layers, in which the fluids A, B are always arranged alternately (A-B-A-B). For certain application cases, it may be desirable to achieve a layer arrangement which is constructed symmetrically with respect to a central plane. In that case two parallel mixers which are being charged with fluids A-B and with fluids B-A would be connected in series with a third mixer so that a layer arrangement A-B-B-A would be created.

What is claimed is:

1. Micro-mixer having at least one mixing point which is connected to an inlet channel arrangement having at least two inlet channels and to an outlet channel arrangement, the inlet channels in the mixing point extending parallel to one another in the same direction, said micro-mixer having a separating element extending into a region of the mixing point in which the inlet channels run parallel to one another, said micro-mixer further comprising a bottom part and a top part which lie next to each other at a join-defining surface, the inlet and outlet channels being in the form of grooves in at least one of the bottom part and top part, said grooves being open towards the join-defining surface and the separating element at least partially covering an overlap region of grooves in the bottom part and top part.

2. Mixer according to claim 1, in which the inlet channels are guided parallel to one another in offset planes at least in a section upstream of the mixing point.

3. Mixer according to claim 1, in which the inlet channels have a width that is greater than their height.

4. Mixer according to claim 1, in which the inlet channels widen upstream of the mixing point but downstream of an inlet point.

5. Mixer according to claim 4, in which widening effects a doubling of width.

6. Mixer according to claim 1, in which the outlet channel arrangement is directed in the same direction as the inlet channels.

7. Mixer according to claim 1, in which at least one outlet channel of the outlet channel arrangement is divided into at least two sub-channels which form an inlet channel arrangement of a following mixing point.

8. Mixer according to claim 7, in which the sub-channels lie in a plane defined by a width dimension of the sub-channels.

9. Mixer according to claim 1, in which the outlet channel arrangement comprises a single outlet channel.

10. Mixer according to claim 1, in which the separating element comprises a flat plate.

11. Mixer according to claim 1, in which the separating element has openings which are substantially smaller than the area of the separating element exposed to the inlet channels.

12. Mixer according to claim 1, in which one liquid path has a course in one plane from at least one inlet channel to the outlet channel arrangement.

13. Mixer according to claim 1, in which parts of the inlet channel arrangement, parts of the mixing point, and the outlet channel arrangement are formed in the bottom part as grooves open towards the join-defining surface, and remaining parts of the inlet channel arrangement and remaining parts of the mixing point are formed as a recess in the top part, which recess is partly covered by the separating element.

14. Mixer according to claim 1, in which the separating element is part of the top part.

15. Mixer according to claim 1, in which the separating element has a recess of concave or triangular construction directed towards the inlet channel arrangement.

16. Mixer according to claim 1, in which the inlet channel arrangement has three inlet channels.

17. Mixer according to claim 16, in which a middle inlet channel, at least in the mixing point, is narrower than the two other inlet channels.

18. Mixer according to claim 16, in which an additional inlet channel arrangement and mixing point are located downstream of the mixing point, the additional mixing point having a lamination action which is rotated through 90° with respect to the first mixing point.

* * * * *

UNITED STATES PATENT AND TRADEMARK OFFICE
CERTIFICATE OF CORRECTION

PATENT NO. : 6,190,034 B1  Page 1 of 1
DATED : February 20, 2001
INVENTOR(S) : Nielsen et al.

It is certified that error appears in the above-identified patent and that said Letters Patent is hereby corrected as shown below:

<u>Title page,</u>
"This patent is subject to a terminal disclaimer", should be deleted.

Signed and Sealed this

Fifth Day of March, 2002

Attest:

Attesting Officer

JAMES E. ROGAN
*Director of the United States Patent and Trademark Office*